US005279486A

United States Patent [19]

Harmon

[11] Patent Number: 5,279,486

[45] Date of Patent: Jan. 18, 1994

[54] MEDICAL SUPPORT DEVICE

[76] Inventor: Elbert C. Harmon, 6708 Gary La., Fort Worth, Tex. 76112

[21] Appl. No.: 41,404

[22] Filed: Mar. 31, 1993

[51] Int. Cl.[5] .............. F16L 3/00

[52] U.S. Cl. .............. 248/122; 248/123.1; 248/285

[58] Field of Search .............. 248/122, 123.1, 280.1, 248/279, 285, 283; 5/646, 648; 128/207.14

[56] References Cited

U.S. PATENT DOCUMENTS

| | | | |
|---|---|---|---|
| 247,403 | 9/1881 | Pistorius | 5/646 |
| 1,032,801 | 7/1912 | Allingham | 248/122 |
| 1,486,120 | 3/1924 | Bayles | 248/648 |
| 1,731,709 | 10/1929 | Cropsey | 5/646 X |
| 2,346,274 | 4/1944 | Raven | 248/121 |
| 2,440,745 | 5/1948 | Hauck | 248/81 |
| 2,718,886 | 9/1955 | Sutton | 5/646 X |
| 2,763,453 | 9/1956 | Palino | 248/122 X |
| 2,795,388 | 6/1957 | Myers | 248/122 |
| 2,963,247 | 12/1960 | Collier et al. | 248/81 |
| 3,236,236 | 2/1966 | Hudson | 128/185 |
| 3,464,411 | 9/1969 | Martinez | 128/145.8 |
| 4,591,121 | 5/1986 | Doyle | 248/201 |
| 4,727,872 | 3/1988 | Hawk | 128/207.14 |
| 5,054,723 | 10/1991 | Arnold | 248/65 |

OTHER PUBLICATIONS

Brochure, "Head Halter Traction at Home"; OTC Professional Appliances, Cincinnati, Ohio 45209; date & author unknown; one page, apparently instructions for use.

*Primary Examiner*—J. Franklin Foss
*Attorney, Agent, or Firm*—Guy V. Manning

[57] ABSTRACT

A medical support apparatus comprises an adjustable davit arm hingedly coupled near the top end of a mast extending vertically from a floor base or other support. The davit arm has an extension beam telescopically cooperating with a cylindrical cavity within the davit arm and a fixing means to secure the beam in longitudinal position. A cable attached to the davit arm and to the end of the beam with pulleys has on one end a gripping means for attaching to a medical apparatus, and on the other end a counterweight for counterbalancing the weight of the medical apparatus.

7 Claims, 3 Drawing Sheets

SECT. 3-3

Fig. 4
SECT. 4-4
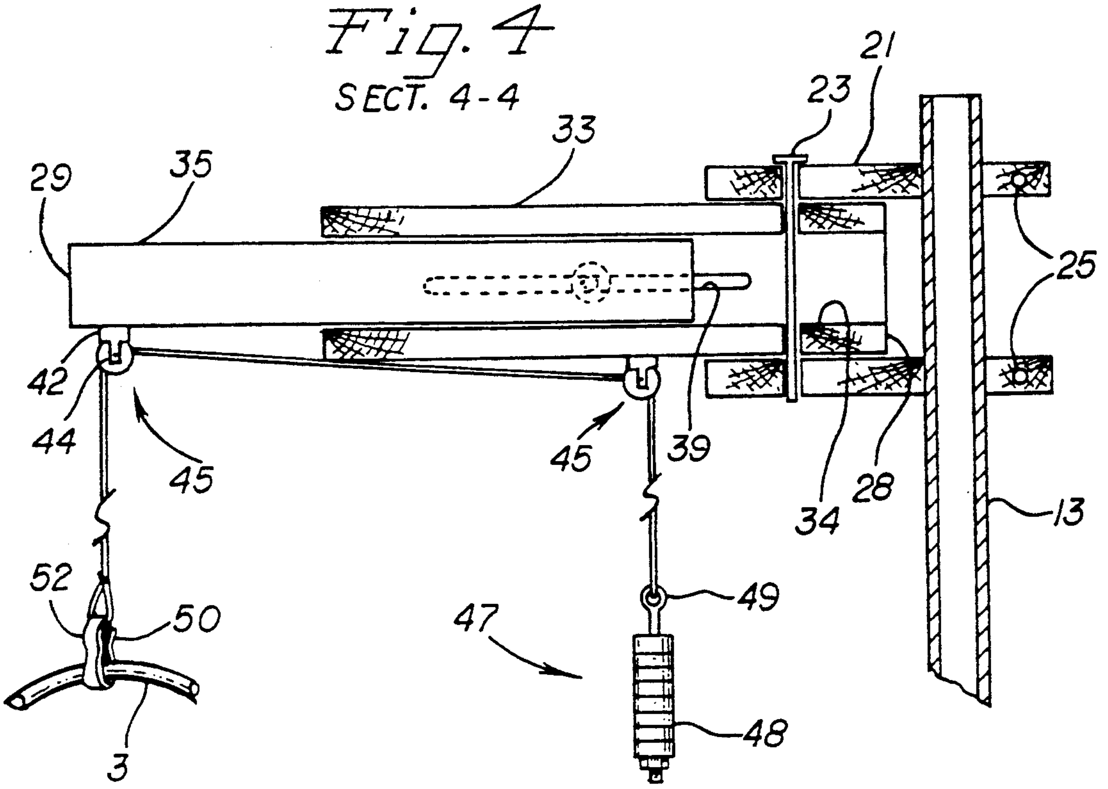
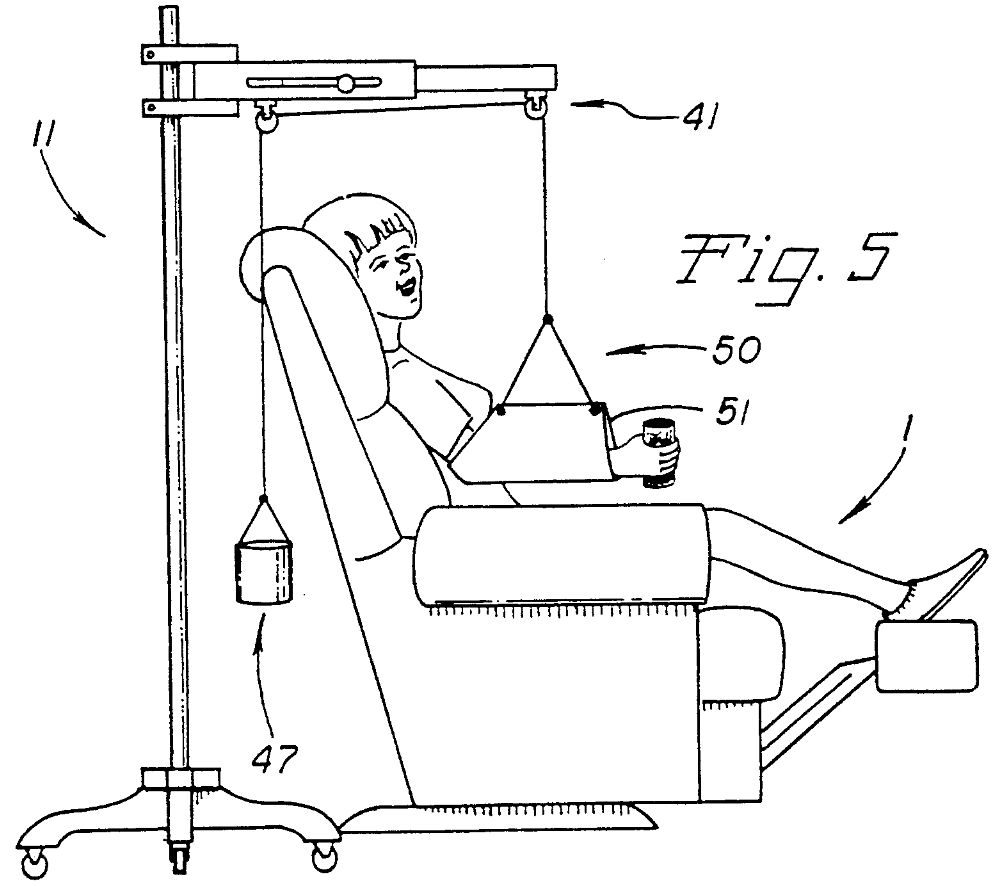
Fig. 5

MEDICAL SUPPORT DEVICE

BACKGROUND OF THE INVENTION

1. Field of the Invention

This invention relates to improvements to medical support devices and particularly to devices adapted to support the weight of a medical apparatus attached to a patient or to support a portion of the patient's body. More particularly, this invention relates to a support for counterbalancing a tracheotomy tube and thereby mitigating discomfort caused to a patient by of its weight or restrictiveness.

2. Description of Related Art

Medical patients in a weakened state from surgery, disease or other medical conditions often are sensitive to the weight of any medical apparatus necessarily attached to them as part of their treatment. The weight of tracheal interfaces, tubes from treatment equipment and the like, for example, can cause considerable discomfort to such patients, whereas healthy persons would not even notice the weight. Often left unsupported and lying across a bedridden patient's chest, the tube can slide off the bed or otherwise shift around and cause irritation at the patient's throat. If taped or clipped to the bed to prevent it from sliding off, the tube restricts the patient's movements dramatically. A need exists for a device which supports a tracheal interface tube without unnecessarily restricting a patient's movements and which mitigates discomfort of the tracheal interface caused by the weight of the tube.

Non-bedridden but nonetheless invalid patients may be able to sit up in a chair, eat on their own, watch television and move about their home or hospital room as long as their movements are not restricted by treatment equipment. Tracheotomy patients who achieve some degree of mobility as a rule find themselves tethered to treatment equipment. Discomfort from the weight and agitation from movement of tracheal interface tubes severely restrict even the simplest movements such as turning one's head, swallowing or talking. Relocation from one resting place to another requires moving the treatment equipment and consequently greater agitation and discomfort from the tubes. Even when beds are equipped with support devices, they usually cannot be removed and relocated conveniently to an upright chair, so the tube simply must be laid across the patient's shoulder or otherwise left vulnerable to falling. A need therefore exists for a trachea tube support device readily movable with an ambulatory patient.

Particularly weak patients, such as those with degenerative muscular conditions, find it difficult or impossible simply to lift their arms to feed themselves. The effort of lifting the weight of their arms combined with the effort of gripping a fork can be more than some can manage. Many times, such patients can grip utensils sufficiently to help themselves and can use them as long as a nurse or attendant helps by lifting the patient's arm. The morale boost from successfully negotiating even such simple tasks can be a significant factor in recovery. Yet, many patients cannot afford the luxury of, and others would not want, the constant attention of an attendant. A need exists therefore for a cost effective apparatus for supporting the weight of a patient's arm to assist in such activities.

Numerous support devices provide support for medical apparatus, but none offer the utility of the present invention. For example, Doyle, U.S. Pat. No. 4,591,121, provides a gantry attached to a bedstead to support multiple fluid containers for intravenous tubes above the patient's pillow. Doyle necessarily requires, however, that the patient be confined to the bed. Hawk, U.S. Pat. No. 4,727,872, provides another gantry suspended above a supine patient with an endotracheal device rigidly gripping the crossmember. Hawk offers no freedom of movement, either.

SUMMARY OF THE INVENTION

Accordingly, it is an object of this invention to provide a support device which mitigates patient discomfort from the weight of tubes or the like connecting the patient to treatment equipment.

It is another object of this invention to provide a support device which minimizes the restriction of patient movements by treatment equipment.

It is another object of this invention to provide an equipment tube support device which is readily transportable with ambulatory patients.

It is yet another object of this invention to provide a support device to assist a patient with lifting objects.

The foregoing and other objects of this invention are achieved by providing a medical support apparatus comprising an adjustable davit hingedly coupled near the top of a mast extending vertically from a floor base or other support. The davit has an extension beam telescopically cooperating with a longitudinal cavity within the davit and a fixing means to secure the beam in position. A cable slidably attached to the davit and to the end of the beam has on one end a gripping means for attaching to a medical apparatus, and on the other end a counterweight for counterbalancing the weight of the medical apparatus.

BRIEF DESCRIPTION OF THE DRAWINGS

The novel features believed characteristic of the present invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

FIG. 4 details in longitudinal cross section the telescoping horizontal arm of FIG. 2.

FIG. 5 demonstrates use of the invention to support a patient's arm.

DETAILED DESCRIPTION OF A PREFERRED EMBODIMENT

Figure 1:
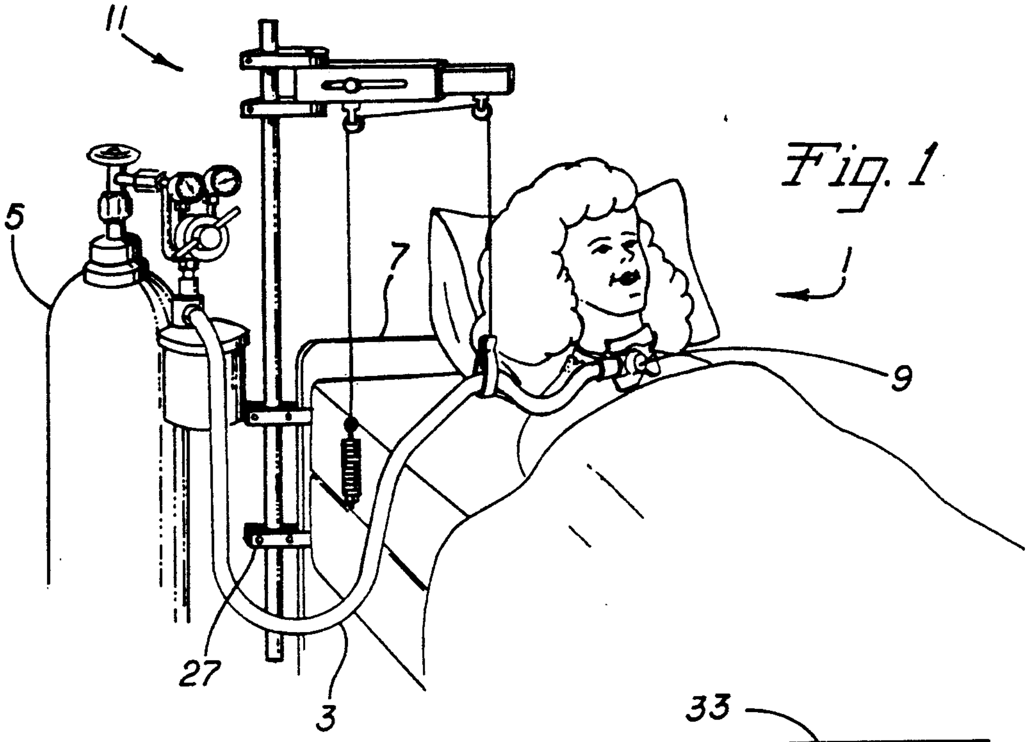
FIG. 1 depicts the support device of the present invention clamped to a bedstead and supporting a tube connecting the patient to treatment equipment.
Figure 2:
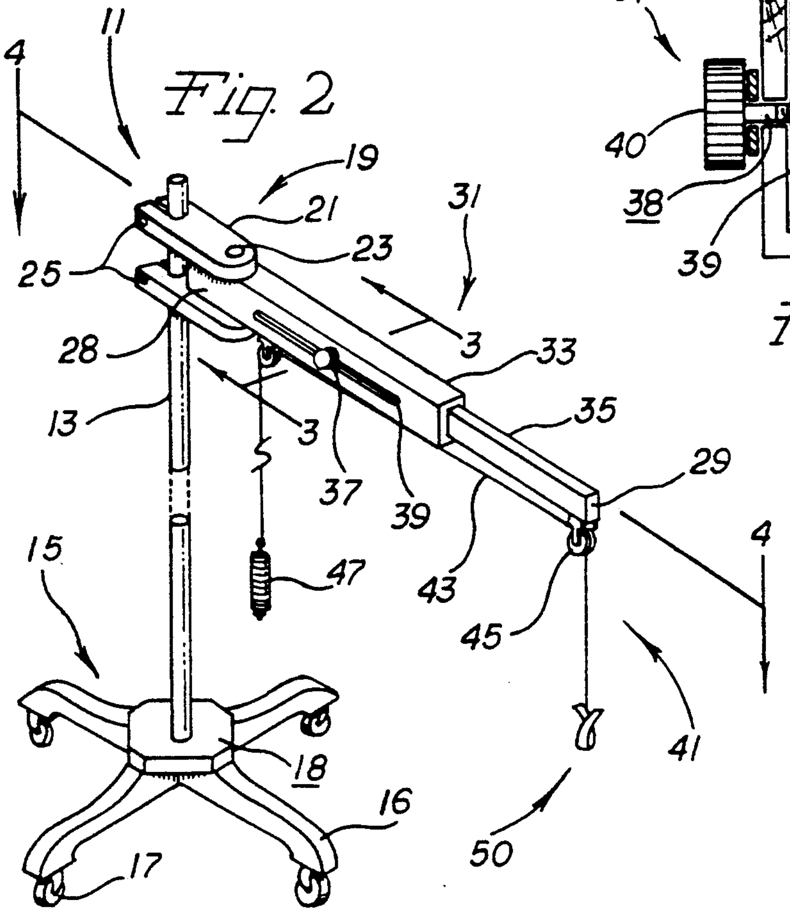
FIG. 2 shows a free-standing preferred embodiment of the invention having a telescoping davit, cable and pulley support means and castors on the base for easy relocation.

With reference now to the figures, and in particular to FIG. 2, support device 11 of the present invention is shown in free-standing form. Base means 15 comprises a plurality of legs 16 supporting center plate 18. Optional castors 7 on legs 16 facilitate relocation of support device 11. Mast 13 stands vertically from center plate 18 sufficiently tall to support davit 31 an appropriate height above patient 1. Alternate base means shown in FIG. 1 comprises clamps 27 gripping mast 13 to couple it to bedstead 7 of patient 1. Support 11 is depicted relieving the weight of tube 3 between tracheal interface 9 and treatment equipment 5.

Figure 3:
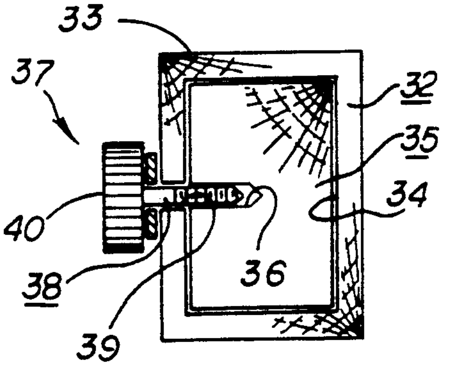
FIG. 3 shows in cross section a detail of the telescoping horizontal arm of FIG. 2.

With reference additionally now to FIGS. 3 and 4, davit 31 comprises rectangular arm 33 hingedly coupled to mast 13. Hinge means 19 comprises two planar plates 21 horizontally coupled to mast 13. Each plate 21 has a cylindrical bore vertically through it and surrounding mast 13. Clamping means 25 tightens plates 21 against mast 13 to frictionally secure plates 21 in a fixed vertical position. Clamping means 25 may be bolts, screws or the like. Pin 12 parallel to mast 13 penetrates plates 21 proximate end 28 of arm 33 to hingedly secure davit 31 to hinge 19 and mast 13. One having ordinary skill in the art will recognize that alternate hinge means could be employed to hingedly couple davit 31 to mast 13 without departing from the spirit and scope of the present invention.

Arm 33 has a substantially rectangular cross section as detailed in FIGS. 3 and 4. Interior wall 32 defines cavity 34 extending the longitudinal length of arm 33. Slot 39 in wall 32 communicates between cavity 34 and the exterior of arm 33 a substantial portion of the longitudinal length thereof. Extension beam 35 slidably cooperates with cavity 34 to extend the effective longitudinal length of davit 31. Shank 38 of thumbscrew 37 cooperates with slot 39 to be received within threaded hole 36 in beam 35. Thumbscrew 37 thereby sandwiches a portion of wall 32 between knob 40 and beam 35 to frictionally fix beam 35 at one of a plurality of available telescopic positions within cavity 33.

Coupled beneath davit 31 is cable means 41 for attaching support 11 to a medical apparatus. Cable means 41 comprises cable 43 slidably received within attachment means 45. Cable 43 is preferably sixteen (16 ga.) gauge stranded steel, but other cables, such as strong twine, having properties of strength, flexibility and resistance to stretching will suffice. Attached to opposite ends of cable 43 are counterweight means 47 and gripping means 50 further discussed below.

Depicted in the form of pulleys, one each of attachment means 45 is coupled to distal end 29 of beam 35 and proximate end 28 of arm 33. One having ordinary skill in the art will recognize that attachment means 45 may comprise other devices such as eye hooks (not shown) as long as cable 43 freely can slide through an aperture thereof. Pulleys 45 may be fixed as depicted, or they may have swivel bases 42 which allow wheel 44 to rotate about a vertical centerline (not shown) through base 42 to maximize the patient's freedom of motion.

Counterweight means 47 suspended by cable 43 adjacent mast 13 from proximate end 28 of davit 31 comprises bolt 49 penetrating an aperture in each of a plurality of weight disks 48. A nut and washer, having a diameter larger than the weight disk 48 apertures, cooperate with bolt 49 to provide a means of holding weight disks 48 in place. One having ordinary skill in the relevant art will recognize that other counterweight configurations could substitute, such as a bag or bucket (FIG. 5) adapted to contain a fluid such as water. The salient feature of counterweight means 47 employed is that it be adjustable to match the weight of the medical apparatus or other load applied at the other end of cable 43.

Gripping means 50 attached to the opposite end of cable 43, suspended from distal end 29 of beam 35, grips or attaches to the medical apparatus. Depicted as a tie strap 52 in FIGS. 1, 2 & 4, gripping means 50 comprises a strip of hook-and-eye cloth commonly known as Velcro. Other tying devices such as twine could just as easily be employed, as well as alternate devices such as clips, clamps, clevises or the like (not shown) as appropriate for the load. FIG. 5 depicts sling 51 adapted to support a patient's arm for relieving her of the weight of her arm while she lifts objects. Correspondingly greater counterweight means 47 would be required to use sling 51 as shown in FIG. 5 than would be necessary to counterbalance tube 3 as depicted in FIG. 1.

Arm 33, beam 35, hinge 23 and base 15 are depicted in the figures as being fabricated from wood, while mast 13 is depicted as being made from metal. Other materials also prove satisfactory, such as metal or plastic tubing for arm 33 and beam 35 and wood for mast 13. The preferred materials would be selected for economy, strength and aesthetic qualities such as appearance and quietness. Further, arm 33 and beam 35 need not be limited to rectangular cross sections as shown, but could be of any convenient cross section such as oval or circular tubing. One having ordinary skill in the relevant art will recognize that all such variations fall within the spirit and scope of the invention.

Figure 6:
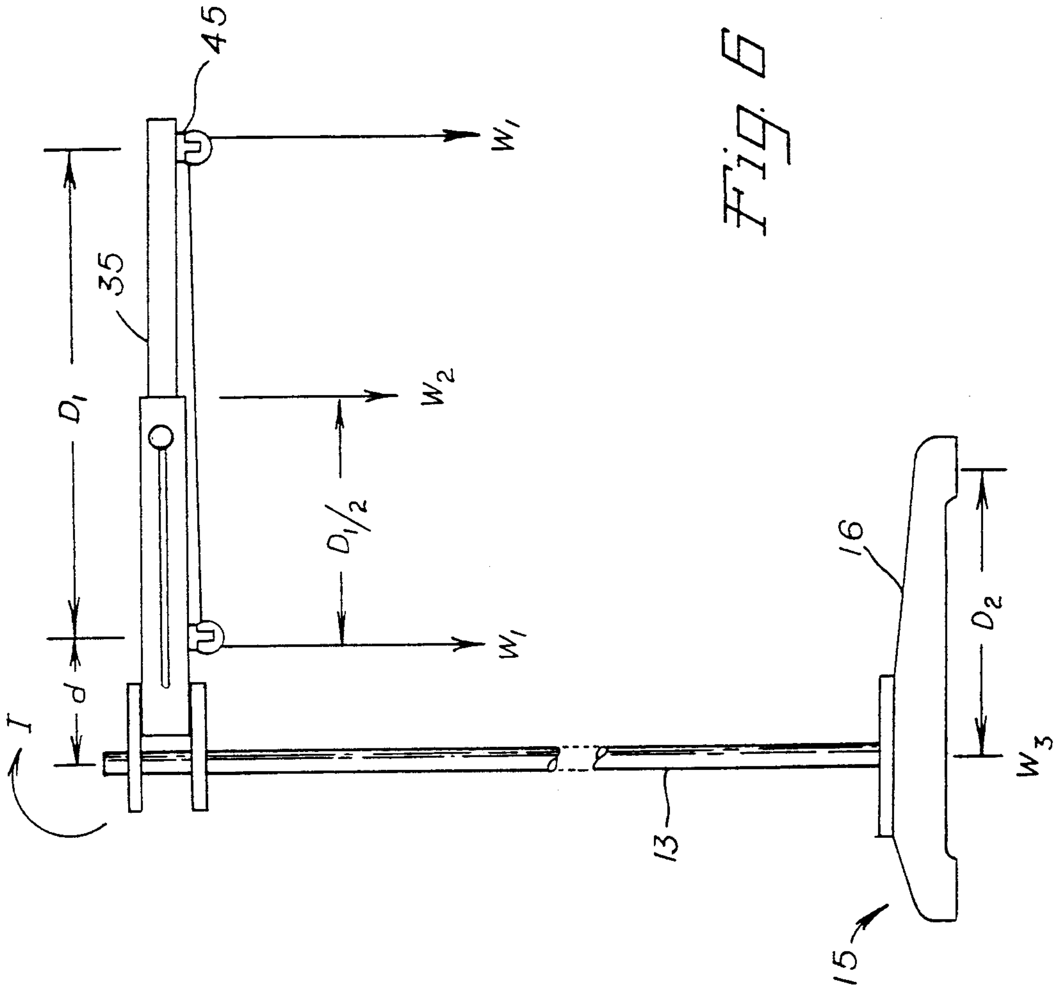
FIG. 6 depicts a moment diagram of the invention under load.

To prevent tipping under cantilevered loads applied at distal end 29, free standing base 15 comprises a significant portion of the mass of support 11. Testing has shown that the relaxed arm of an adult of typical height and weight weights approximately three to four pounds. The moment diagram of FIG. 6 demonstrates that a base 15 weight of thirty (30 lbs.) pounds proves satisfactory for most loads up to approximately six (6 lbs.) pounds applied with beam 35 extending davit 31 to a maximum length of 40 inches. The tipping equilibrium equations derived from FIG. 6 are:

$$I = W_2(d + (D_1/2))/12$$

and $$W_3(D_2/12) \geqq I$$

or $$W_3 \geqq 12I/D_2 \geqq W_2(d + (D_1/2))/D_2$$

where

I = moment of equilibrium

D = separation of pulleys 45

$W_2 = W_1 + W_1$ $D_2$ = effective leg 16 length $W_3$ = weight of base 15 d = spacing between mast 13 and counterweight 47.

Thus, where $D_1 = 36''$, $D_2 = 12$, $d = 4''$ and $W_1 = 6$ lbs.: $W_3 = 12(4 + (36/2))/12 = 22$ lbs.

A thirty pound base 15 thus provides an eight pound safety factor in excess of $W_3$ under six pound patient arm weight loading which itself includes approximately a two-to-one safety factor.

Of course, base 15 weight would necessarily increase with additional loads. External weight (not shown) can be added to base 15, and the foregoing calculation discounts the contribution of the weight of the rest of support 11, which is additive with the weight of base 15. Further, the foregoing calculations contemplate that the "effective leg length" is equal in length to the perpendicular distance from mast 13 to an imaginary line between the ends of legs 16. For four equally spaced radial legs 16 as depicted in FIG. 2, then, the actual leg 16 lengths would be approximately seventeen (17 in.) inches ($12'' \times \sqrt{2}$). Alternate leg configurations, such as asymmetric legs having elongated feet (not shown) expected to rest under the load, could reduce the weight requirement. Obviously, the alternate bedstead attachment 27 depicted in FIG. 1 obviates most of the concerns about the weight of base means 15.

In operation, support 11 is located at a position near patient 1 whereby davit 31 reaches over the medical apparatus to be supported. If patient 1 is ambulatory, support 11 equipped with base 15, particularly with castors 17, may be most useful, whereas alternate bedstead clamps 27 may be preferable for a bedridden patient 1. Beam 35 is extended to bring its distal end 29 directly over the load and thumbscrew 37 is tightened to hold beam 35 in place. Gripping means 50 is connected to the medical apparatus and an appropriate number of weight disks 48 are selected and attached to bolt 49 as nearly as possible to counterbalance the weight of the medical apparatus.

In use, support 11 permits three dimensional movement by patient 1 tethered to treatment equipment 5. Cable 43 obviously can swing in a circular arc radial from a vertical axis directly beneath distal end 29. In addition, hinge 19 permits distal end 29 to move in a horizontal arc radial from mast 13 to increase the effective distance of movement allowed for gripping means 50. Finally, cable 43 freely can slide through attachment means 45 to permit vertical movement of gripping means 50. Preferably, attachment means 45 presenting the least frictional resistance to cable 43 are employed, pulleys providing the most likely selection.

Support 11 thus provides means for assuming the weight of medical apparatus such as a tube 3 connecting a patient's tracheal interface 9 with support equipment. This relieves the patient's throat of most of the weight of tube 3 and mitigates discomfort of wearing such medical apparatus. Further, using a suitable base 15 and gripping means 50, a free standing support 11 also reliably can assist patient 1 in lifting objects by counterbalancing all or part of the weight of her arm. Thus, her muscles are called upon only to lift the object and to maneuver it as needed. Finally, rather than being confined to a bed as with many prior art support devices, patient 1 also can move about relatively freely within the freedom of motion of cable means 41, davit 31 and the length of tube 3. With transportable treatment equipment 5 and using free standing support 11 with castors 17, patient 1 can conveniently move about her home or hospital room.

While the invention has been particularly shown and described with reference to a preferred embodiment, it will be understood by those skilled in the art that various changes in form and detail may be made therein without departing from the spirit and scope of the invention. To provide additional horizontal freedom of movement, for example, beam 35 may be allowed to slide in and out of cavity 34 under controlled drag conditions. Once pressure toward mast 13, applied by patient 1 to distal end 29 through cable 43, overcomes the drag, beam 35 would telescope into cavity 34 rather than to remain fixed by thumbscrew 37. In such arrangement, thumbscrew 37 would serve as a stop post within slot 39 to present limits to the travel of beam 35 and retain it within cavity 34.

I claim:

1. A medical support device comprising
   base means;
   a mast extending vertically from the base means;
   an arm having a longitudinal arm axis;
   hinge means coupled between the mast and the arm for hingedly supporting the arm with its axis radial to the mast while permitting the arm to swing freely in a horizontal arc about the mast;
   wherein the hinge means comprises two planar plates, each plate having a bore surrounding the mast; clamping means for tightening the plates against the mast; and pin means penetrating the plates and one end of the arm for hingedly pinning the arm to the plates;
   extension means coupled to the arm for extending a longitudinal length of the arm; and
   support means coupled to the arm for supporting a medical apparatus.

2. The medical support device according to claim 1 wherein the base means comprises
   a plurality of clamps adapted to grip an edge of a bed, each of the clamps having a bore adapted to receive and frictionally hold the mast.

3. A medical support device comprising
   a base having a plurality of substantially horizontal legs radiating from a center;
   a mast extending vertically from the center of the base;
   an arm hingedly coupled to the mast, the arm having a longitudinal axis and an interior cavity extending substantially the longitudinal length of the arm, the arm further having a slot communicating between the cavity and an exterior surface of the arm, the slot having a longitudinal length parallel to the axis and a transverse width;
   an extension beam adapted to be received within the cavity, the beam having a threaded hole in one side;
   a thumbscrew having a knob lager than the width of the slot and cooperating with the slot to be received within the threaded hole from exterior the arm;
   a pully coupled to the extension beam;
   at least one pully coupled to the arm;
   a cable received within the pulleys;
   gripping means attached to one end of the cable for gripping the medical apparatus; and
   counterweight means coupled to the cable opposite the gripping means for counterbalancing the weight of a load.

4. An improved method of mitigating a medical patient's discomfort from the weight of a worn medical apparatus, the method comprising
   providing a support for bearing the weight of the medical apparatus, the support comprising
      base means;
      a mast extending vertically from the base means;
      an arm hingedly coupled to the mast, the arm having a longitudinal axis and an interior cavity extending substantially the longitudinal length of the arm, the arm further having a slot communicating between the cavity and an exterior surface of the arm, the slot having a longitudinal length parallel to the axis and a transverse width;

an extension beam adapted to be received within the cavity, the beam having a threaded hole in one side;

a thumbscrew having a knob larger than the width of the slot and cooperating with the slot to be received within the threaded hole from exterior the arm;

a pully coupled to the extension beam;

at least one pully coupled to the arm;

a cable received within the pulleys;

gripping means attached to one end of the cable for gripping the medical apparatus; and counterweight means on the cable opposite the gripping means, the counterweight means having adjustable weights for counterbalancing the weight of the medical apparatus; then arranging the support near the patient whereby the end of the extension beam extends above the medical apparatus; then fixing the extension beam relative the arm; then attaching the gripping means to the medical apparatus; then adjusting the weights of the counterweight means for counterbalancing the weight of the medical apparatus.

5. An improved method of reducing the force required of a medical patient to lift objects, the method comprising providing a support for bearing the weight of the patient's arm, the support comprising base means;

a mast extending vertically from the base means;

a davit hingedly coupled to the mast, the davit having a longitudinal axis and an interior cavity extending substantially the longitudinal length of the davit, the davit further having a slot communicating between the cavity and an exterior surface of the davit, the slot having a longitudinal length parallel to the axis and a transverse width;

an extension beam adapted to be received within the cavity, the beam having a threaded hole in one side;

a thumbscrew having a knob larger than the width of the slot and cooperating with the slot to be received within the threaded hole from exterior the davit;

a pully coupled to the extension beam;

at least one pully coupled to the davit;

a cable received within the pulleys;

cradle means attached to one end of the cable for cradling the patient's arm; and a plurality of weights adapted to be secured to the bolt for counterbalancing the weight of the patient's arm; then arranging the support near the patient whereby the end of the extension beam extends above the patient's arm; then fixing the extension beam relative the davit; then attaching the cradle means to the patient's arm; then selecting a plurality of the weights together comprising in aggregate weight substantially the weight of the patient's arm; then securing the selected weights to the bolt for counterbalancing the weight of the patient's arm.

6. A medical support device comprising base means;

a mast extending vertically from the base means;

and arm hingedly coupled to the mast, the arm having a longitudinal arm axis;

arm extension means coupled to the arm and having a beam cooperating with an interior cavity of the arm extending substantially its longitudinal length;

a slot communicating between the cavity and an exterior surface of the arm, the slot having a longitudinal length parallel to the arm axis and a transverse width; and a thumbscrew having a threaded shank, a first end bearing a knob larger than the width of the slot, and a second end opposite the knob and adapted to cooperate with the slot for securing the beam to the arm for exterior the arm; and support means coupled to the arm for supporting a medical apparatus.

7. A medical support device comprising base means;

a mast extending vertically from the base mans;

an arm coupled to the mast, the arm having an interior cavity;

a beam adapted to be received within the cavity;

a slot communicating between the cavity and an exterior surface of the arm;

thumbscrew means cooperating with the slot for securing the beam to the arm from exterior the arm; and support means coupled to the arm for supporting a medical apparatus.

* * * * *